United States Patent

Kanemoto et al.

[11] Patent Number: 5,243,451
[45] Date of Patent: Sep. 7, 1993

[54] DAP TYPE LIQUID CRYSTAL DEVICE WITH CHOLESTERIC LIQUID CRYSTAL BIREFRINGENT LAYER

[75] Inventors: Akihiko Kanemoto; Haruo Iimura, both of Yokohama; Yasuyuki Takiguchi, Kawasaki, all of Japan

[73] Assignee: Ricoh Company, Ltd., Tokyo, Japan

[21] Appl. No.: 585

[22] Filed: Jan. 5, 1993

Related U.S. Application Data

[63] Continuation of Ser. No. 523,364, May 15, 1990, abandoned.

[30] Foreign Application Priority Data

May 15, 1989 [JP] Japan .................. 1-121049
Mar. 6, 1990 [JP] Japan .................. 2-54618

[51] Int. Cl.⁵ .................. G02F 1/133; G02F 1/1335; G02F 1/13
[52] U.S. Cl. .................. 359/53; 359/73; 359/105
[58] Field of Search .............. 350/335, 347 R, 350 R; 252/299.01, 299.7; 359/53, 73, 105

[56] References Cited

U.S. PATENT DOCUMENTS

| | | | |
|---|---|---|---|
| 3,888,892 | 6/1975 | Leder | 350/350 R |
| 4,701,028 | 10/1987 | Clerc et al. | 359/73 |
| 4,813,770 | 5/1989 | Clerc et al. | 359/73 |
| 4,844,569 | 7/1989 | Wada et al. | 350/335 |
| 5,175,638 | 12/1992 | Kanemoto et al. | 359/73 |

*Primary Examiner*—William L. Sikes
*Assistant Examiner*—Anita Pellman Gross
*Attorney, Agent, or Firm*—Oblon, Spivak, McClelland, Maier & Neustadt

[57] ABSTRACT

Disclosed herein is a DAP type-ECB system liquid crystal display device comprising (1) a liquid crystal cell in which a liquid crystal layer is sandwiched between a pair of substrates each having at least one electrode, (2) a birefringent layer sandwiched between a substrate and the liquid crystal cell and (3) a pair of polarizers disposed on outer surfaces of the substrates. The birefringent layer comprises a liquid crystal compound showing a cholesteric liquid crystal phase or a polymer film obtained by quenching a polymer showing a cholesteric phase to fix the aligning direction of the polymer molecules, and refractive indexes $n_x$, $n_y$ within a plane of the birefringent layer and the refractive index $n_z$ in the direction perpendicular to the plane have a relationship:

$$n_x = n_y > n_z.$$

8 Claims, 2 Drawing Sheets

DAP TYPE LIQUID CRYSTAL DEVICE WITH CHOLESTERIC LIQUID CRYSTAL BIREFRINGENT LAYER

This application is a Continuation of application Ser. No. 07/523,364, filed on May 15, 1990, now abandoned.

BACKGROUND OF THE INVENTION

The present invention concerns a liquid crystal display device. A liquid crystal display device in which light modulation is conducted by the change of birefringence value of a liquid crystal layer by applying a voltage thereto, has already been known. In the liquid crystal display device of this type, however, since the distance of the actual path of light in the liquid crystal layer varies depending on a viewing angle and apparent birefringence value varies depending on the relative angle between the aligning direction of liquid crystal molecules and the viewing angle direction, viewing angle dependency of the display characteristic is remarkably great and an angular range capable of visually recognizing the display is extremely narrow.

In order to reduce such a viewing angle dependency of the display characteristic, there has been proposed to dispose a birefringent layer between a liquid crystal layer and a polarizer. For instance, Japanese Patent Laid Open Sho 62-210423 discloses a DAP system-ECB type liquid crystal display device wherein light modulation is conducted by applying a voltage to a liquid crystal layer including the liquid crystal molecules subjected to homeotropic alignment, to change the birefringence value in the liquid crystal layer, and wherein a polymer film prepared so as to have a negative optical anisotropy is disposed as the birefringent layer, and viewing angle compensation is conducted by the birefringent layer.

Further, Japanese Patent Laid Open Sho 64-519 (1989) has proposed a STN type liquid crystal display device in which an optically anisotropic member having an optical property complementary to that of a liquid crystal is disposed between the liquid crystal cell and a polarizer, and thereby viewing angle compensation is conducted. That is, it is substantially required in this device that the optical anisotropic member has the same values for $\Delta$ n.d (the product of the refractive index anisotropy and the thickness) and for twist angle (the twisting direction being opposite) as those of the liquid crystal, and that the optical axis on the surface of the anisotropic member opposed to the liquid crystal cell forms an angle of 90° to the rubbing direction on the upper electrode substrate of the liquid crystal cell.

As has been described above, the characteristics required for such a birefringent layer for viewing angle compensation generally depend on the modes of the liquid crystal display device (STN, ECB, DAP, HAN, TB, etc.), cell parameters (direction of the optical axis of the polarizer, birefringence value $\Delta$ n.d, etc. of the liquid crystal layer), kinds of the substrate and the like, and may be various factors. A birefringent layer for viewing angle compensation in which the refractive index $n_x$, $n_y$ within a plane of the birefringent layer is greater than the refractive index $n_z$ in the direction perpendicular to the plane and which is useful for viewing angle compensation of especially DAP, HAN or a skew alignment-type liquid crystal display device, has not been satisfactorily obtained with the reasons as described below.

(1) In a uniaxially stretched polymer as described in Japanese Patent Laid Open Sho 64-519, since $n_x$ is different from $n_y$, the direction capable of viewing angle compensation is limited to a narrow range.

(2) In a polymer as described in Japanese Patent Laid Open Sho 62-210423, an extremely special molding is necessary, so that preparation of a homogenous film is difficult and control of the birefringence value is also extremely difficult.

(3) In a cell including a usual smectic or nematic liquid crystal comprising rod-like molecules subjected to homogeneous alignment, since the refractive index n in the major axis direction of molecules is generally greater than the refractive index n in the minor axis direction of molecules, the range capable of viewing angle compensation is restricted by the same reason as in (1) above.

(4) Japanese Patent Application Laid Open Sho 64-519 discloses the use of a liquid crystal polymeric film showing a cholesteric phase as the optical isomer but, since the cholesteric pitch of the film becomes greater than the wavelength of visible ray for satisfying the foregoing conditions in view of practical use, it is difficult to render the refractive index within the plane of the birefringent layer isotropic to the visible ray.

The present inventors have made a study on a liquid crystal display device having a birefringent layer for viewing angle compensation free from the foregoing drawbacks and, as a result, have succeeded in remarkably reducing the viewing angle dependency of the display characteristic of the device by using, as a birefringent layer, a liquid crystal or polymer film prepared by a simple method, having a refractive index; $n_x = n_y > n_z$ and showing a homogeneous cholesteric phase, and the present invention has been achieved based on the above finding.

The object of the present invention is to provide a liquid crystal display device having display characteristics with improved viewing angle dependency.

SUMMARY OF THE INVENTION

In an aspect of the present invention, there is provided a liquid crystal display device, comprising:

(1) a liquid crystal cell in which a liquid crystal layer sandwiched between a pair of substrates each having at least one electrode;

(2) a birefringent layer sandwiched between a substrate and the liquid crystal cell; and (3) a pair of polarizers disposed on outer surfaces of the substrates, wherein (i) light modulation of the liquid crystal display device is conducted by inputting an electric signal to the electrodes, (ii) the birefringent layer comprises a liquid crystal compound showing a cholesteric liquid crystal phase or a polymer film obtained by quenching a polymer showing a cholesteric phase to fix the aligning direction of the polymer molecules, (iii) the product of a pitch of a helical structure of the cholesteric liquid crystal phase or the polymer film and a refractive index in the maximum refractive index direction of the birefringent layer is smaller than 400 nm, and (iv) the helical axis of the helical structure substantially coincides with the thickness direction of the birefringent layer.

DETAILED DESCRIPTION OF THE INVENTION

Figure 1:
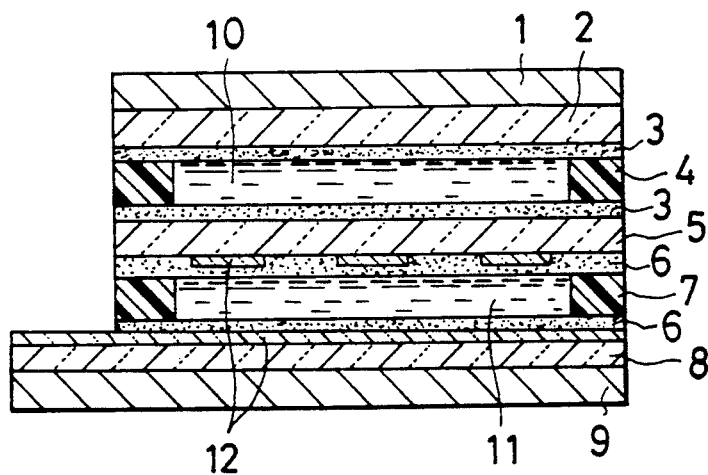
FIG. 1 is a cross sectional view illustrating one structural embodiment of a liquid crystal display device according to the present invention.

. The liquid crystal display device according to the present invention comprises (1) a liquid crystal cell in which a liquid crystal layer is sandwiched between a pair of substrates each having at least one electrode, (2) a birefringent layer sandwiched between a substrate and the liquid crystal cell and (3) a pair of polarizers disposed on outer surfaces of the substrates (that is, all of the liquid crystal layer, the birefringent layer and the substrates are sandwiched between the pair of polarizers), and the birefringent layer comprises a liquid crystal compound showing a cholesteric liquid crystal phase or a polymer film obtained by quenching a polymer showing a cholesteric phase to fix the aligning direction of the polymer molecules.

The liquid crystal molecules used for the birefringent layer in the present invention are liquid crystal molecules of cholesteric liquid crystal or chiral nematic liquid crystal showing a cholesteric liquid crystal phase, in which the liquid crystal molecules are aligned substantially in parallel to the substrate plane such that the helical axis of the helical structure in the cholesteric liquid crystal layer substantially coincides with the thickness direction of the birefringent layer.

Further, it is necessary that the birefringent layer has the following characteristics (i) and (ii). (i) They can be regarded substantially isotropic to visible ray within a plane of the birefringent layer. (ii) The refractive index in the thickness direction of the birefringent layer is smaller than the average refractive index within the plane of the birefringent layer.

In order that a liquid crystal compound (cholesteric liquid crystal and chiral nematic liquid crystal) having the crystal molecular alignment substantially parallel to the substrate plane and showing a cholesteric liquid crystal phase can satisfy the characteristic (i) above, it is necessary that the cholesteric pitch is smaller than the wavelength of visible ray (400 to 800 nm).

In the same manner, it is necessary that the product of the refractive index in the maximum refractive index direction of the liquid crystal and the pitch of the liquid crystal is smaller than 400 nm, in order to prevent coloration due to selective reflection by the helical structure.

The above-mentioned characteristic (ii) can necessarily be satisfied when usual liquid crystal molecules are aligned substantially in parallel to the substrate plane. Further, a polymer of not showing a cholesteric phase at a room temperature, but at a temperature higher than the room temperature showing a cholesteric phase in which the product of a pitch and a refractive index in the maximum refractive index direction is smaller than 400 nm and the helical axis of the helical structure of the cholesteric phase substantially coincides with the thickness direction of the birefringent layer, can preserve the helical structure by quenching from the high temperature and, accordingly, it can be used for the birefringent layer in the present invention as well as the liquid crystal compound showing the cholesteric liquid crystal phase as described above.

The viewing angle dependency of the display characteristics of the liquid crystal display device can be remarkably reduced by disposing the birefringent layer having the foregoing characteristics according to the present invention between a conventional liquid crystal cell (hereinafter referred to as "driven cell") and a polarizer.

The liquid crystal display device according to the present invention will be explained in more detail referring to the drawings.

FIG. 1 is a cross sectional view illustrating one specific embodiment for the constitution of a liquid crystal display device according to the present invention, in which are shown polarizers 1, 9, substrates 2, 5, 8, aligning films 3, 6, sealing members 4, 7, a first liquid crystal layer 10, a second liquid crystal layer 11 and electrodes 12.

A portion sandwiched between the lower substrate 8 and the intermediate substrate 5 constitutes a driven cell, in which light modulation is conducted by applying a voltage via the electrodes 12 to the second liquid crystal layer 11 subjected to alignment by a pair of aligning films 6, 6, thereby changing the aligning state of the driven cell. A portion sandwiched between the upper substrate 2 and the intermediate substrate 5 constitutes a liquid crystal cell for viewing angle compensation, and the liquid crystal molecules of the first liquid crystal layer 10 comprising liquid crystal compound showing a cholesteric liquid crystal phase are aligned substantially in parallel to the substrate plane by means of a pair of aligning films 3, 3. According to the present invention, a polymer film obtained by quenching a polymer showing a cholesteric phase can also be used instead of a viewing angle compensating cell provided with a liquid crystal layer comprising a liquid crystal compound showing the cholesteric liquid crystal phase, and the portion of polymer film is unnecessary to be part of a cell. Further, it is required that the polymer molecules showing the cholesteric phase are aligned substantially in parallel to the planes of the substrate and the birefringent layer such that the helical axis of the helical structure in the cholesteric phase coincides substantially with the thickness direction of the birefringent layer. The polymer film having such aligning direction of the molecules can be made by using a usual homogeneous aligning agent or applying a shearing stress to the polymer-coated surface.

As typical examples of liquid crystal compounds used in the present invention showing the cholesteric liquid crystal phase having a short pitch, at least one compound selected from the compounds represented by the following structural formula may be used.

Group I (a) Azomethine compounds (a) Azomethine compounds

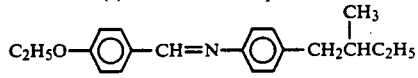

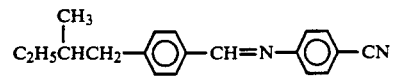

-continued (b) Azoxy compounds

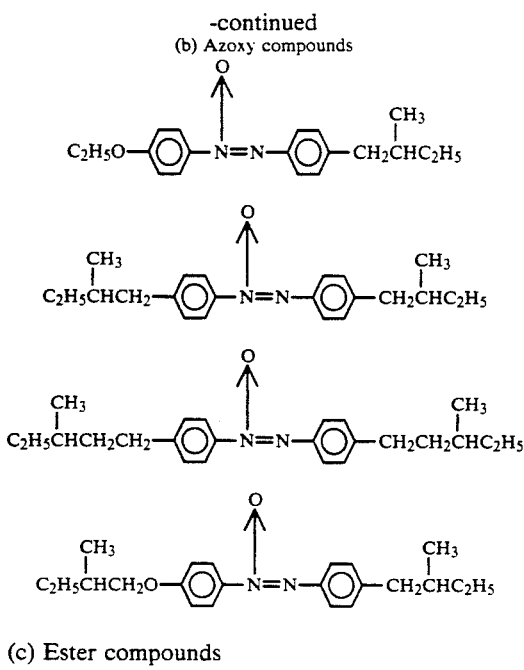

(c) Ester compounds

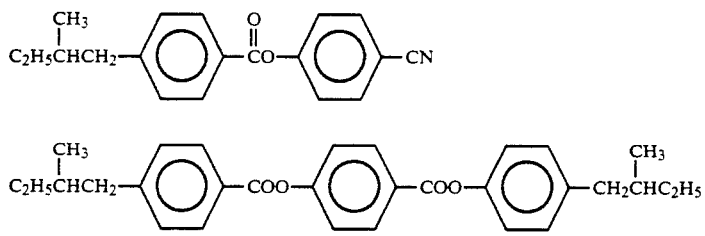

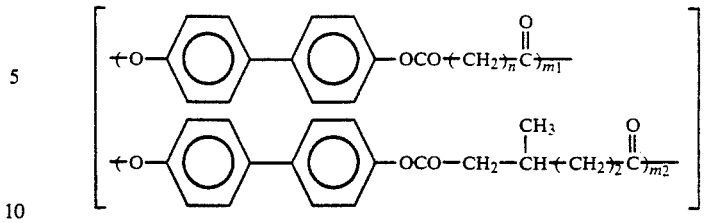

In the substance belonging to the group I, there is a substance not showing a liquid crystal phase at a room temperature, but it is possible to obtain liquid crystal compounds showing a cholesteric phase at a room temperature by mixing two or more of the substances included in the group I or mixing one of the substance of the group I with a nematic liquid crystal.

Further, as typical examples of the polymer used in the present invention which shows a cholesteric phase having a short pitch at a temperature higher than a room temperature and is capable of preserving even at a room temperature after quenching the helical structure developed at that high temperature, at least one compound selected from the following polypeptide and polyester may be used.

Group II (a) copolymer of benzyl-L-glutamate and dodecyl-L-glutamate.

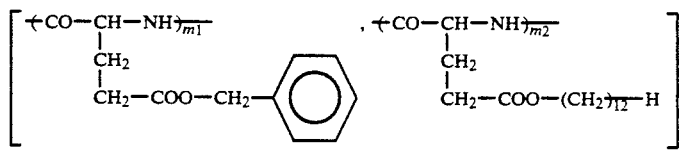

(b) copolymer obtained by reaction of 4,4'-dihydroxybiphenyl, (+)-3-methyladipic acid and aliphatic dicarboxylic acid.

The compounds used in the birefringent layer in the present invention are not necessarily restricted to those exemplified above. For instance, a biphenyl compound such as a cyanobiphenyl compound may be used as the compound belonging to the above Group I.

Although the driven cell has the intermediate substrate 5 in common with the viewing angle compensating cell in the embodiment shown in FIG. 1, it is possible to prepare the two liquid crystal cells quite separately by using another sheet of substrate and then joining them together.

Further, in a case of using the above-mentioned polymer film instead of the viewing angle compensating cell provided with a liquid crystal layer comprising a liquid crystal compound showing the cholesteric liquid crystal phase, the sealing member 4, etc. are not necessary, that is, a polymer film in which the polymer molecules are aligned on a sheet of substrate may also be used.

According to the present invention, it is possible to remarkably improve the viewing angle dependency of the display characteristics by the use of birefringent layer having satisfactory property and manufactured by a simple method.

Description will be made to the examples of the present invention.

EXAMPLE 1

(1) Driven cell

A homeotropic aligning agent FC-805 manufactured by 3M Co. as an aligning agent was spin-coated on two sheets of glass substrate provided with transparent electrodes, baked and subjected to rubbing treatment by sponge. Plastic beads having an average diameter of 11.0 μm were scattered as a spacer on one of the thus treated substrates, and the two substrates were joined together such that their rubbing directions were antiparallel to each other and the rubbed surfaces were opposed to each other. Further, nematic liquid crystal (ZLI 4318, manufactured by Merk Co.) having negative dielectric anisotropy was sealed in the space between the substrates to obtain a driven cell.

(2) Cell for viewing angle compensation

A homogeneous aligning agent (HL-1110, manufactured by Hitachi Kasei Co.) was spin-coated as an aligning agent on two sheets of glass substrate without an electrode, baked and subjected to rubbing treatment by sponge. Plastic beads having an average diameter of 40 μm were scattered as a spacer on one of the thus treated substrates, and the two substrates were joined together such that the rubbed surfaces were opposed to each other, and liquid crystal represented by the following structural formula was sealed in the space between the substrates to obtain a viewing angle compensating cell:

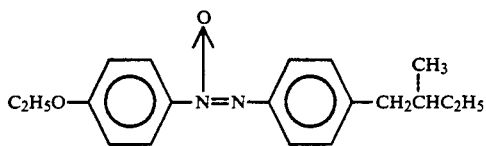

Since the liquid crystal composition showed a liquid crystal phase within a temperature range of from 4° to 76° C., it could be used even alone in the same manner as usual liquid crystal. The product of the pitch of the helical axis and the refractive index in the maximum refractive index direction of the resultant cholesteric liquid crystal phase was about 280 nm. The viewing angle compensating cell was transparent and it was found from the observation by a polarization microscope that the helical axis was disposed substantially in perpendicular to the substrate plane.

(3) Evaluation of the viewing dependency

A liquid crystal display device was formed by inserting a driven cell between two polarizing plates in a cross-nichol state such that the angle between the rubbing direction and the transmission axis of the polarizing plate became 45° C. When driving signals were inputted to the electrodes of the device, various kinds of colors appeared depending on the signals. Since the color varied remarkably depending on the viewing angle, it was recognized that the viewing dependency of the display characteristics in the device was great. Then, in a device obtained by inserting the viewing angle compensating cell prepared in (2) above between the driven cell and the polarizing plate, the viewing angle dependency of the color change was reduced and therefore, it was recognized that the visual angle was widened.

EXAMPLE 2

A driven cell similar to that in Example 1 was manufactured by using a homeotropic aligning agent (ZLI 3334, manufactured by Merk Co.) as an aligning agent.

On the other hand, a polymer film manufactured as described below was used instead of the liquid crystal cell of the cholesteric phase as the viewing angle compensating cell. That is, a small amount of a compound belonging to group II(b) in which n=8 and $m_1:m_2=0.4:0.6$ was coated on a glass substrate and, while being heated at 300° C., the polymer was rolled between the glass substrate and another glass substrate. Then, the temperature of the rolled polymer was lowered to about 250° C. to obtain a cholesteric phase. Subsequently, the two glass substrates were somewhat slipped from each other till the polymer film entirely became transparent.

Then, the polymer film was quenched. When the thickness of a portion in which the polymer was not inserted between the two glass substrates was measured at several points, the average thickness was about 45 μm. The product of the pitch of the helical axis and the refractive index in the maximum refractive index direction of the resultant polymer film was about 340 nm. The molecular weight of the used polymer was not decided, however, when the polymer was dissolved in a mixed solvent of phenol and tetrachloroethane at the mixed ratio of 3:2 by weight and the inherent viscosity of the polymer solution of 0.5 g/dl in concentration was measured, the obtained inherent viscosity value was about 0.4 dl/g.

In a device obtained by inserting the thus prepared polymer film between the driven cell and the polarizing plate, it was confirmed that the viewing angle dependency of the display characteristics was reduced and the visual angle was widened.

EXAMPLE 3

(1) Liquid crystal cell for viewing angle compensation

A homogeneous aligning agent (HL 1110, manufactured by Hitachi Kasei Co.) was coated on a glass substrate at a thickness of about 1000Å, dried and thereafter subjected to rubbing treatment in one direction by sponge. A substrate subjected to the similar treatment and the above-mentioned substrate were joined together via a spacer having an average diameter of 12 μm such that the rubbed surfaces were opposed to each other. A mixture of cholesteric liquid crystal prepared by adding 15 parts by weight of cholesteric liquid crystal (cyanobiphenyl compound CB 15, manufactured by BDH Co.) to 100 parts by weight of cholesteric liquid crystal (TM 736, manufactured by BDH Co.) was injected into the space between the substrates and, then, heated at 80° C. to render the mixture isotropic and then cooled to a room temperature. The product of the pitch and the refractive index in the maximum refractive index direction was 420 nm in TM 736 used in the present embodiment and blue coloration was observed in itself. However, when 15 wt % of CB 15 was added as above, the value of the product was reduced to 360 nm and the coloration was scarcely observed. The alignment of the liquid crystal molecules in the resultant liquid crystal cell was substantially uniform domain, and this cell showed substantially completely dark visual field when observed by being inserted between polarizing plates in which the transmission axes were disposed orthogonally to each other.

Further, when the cell was observed by conoscope using a polarization microscope, a distinct isogyre was observed at the center of the visual field and it was seen that the liquid crystal cell according to the present invention can be regarded as a uniaxial crystal having an optical axis in the direction perpendicular to the substrate plane. Further, when a sensitive color plate was inserted during the conoscope observation, increase and decrease of negative retardation inherent to the uniaxial crystal were observed. The retardation $(n_x-n_z)*d$ was 0.8 μm (d: thickness of the liquid crystal layer).

(2) Driven cell 0.1% solution of a homeotropic aligning agent (ODS-E, manufactured by Chisso Co.) was coated on a glass substrate, and subjected to heat treatment at 120° C. and then to rubbing treatment in one direction. Another substrate subjected to the similar treatment and the above-mentioned substrate were joined together via a spacer having an average diameter of 6.4 μm such that the rubbing directions were antiparallel to each other and the rubbed surfaces of the substrates were opposed to each other, and nematic liquid crystal ZLI 4318 (Δ n=0.1243, manufactured by E, Merk Co.) having negative dielectric anisotropy was sealed in the space between the substrates to obtain a driven cell.

(3) Evaluation of the viewing angle dependency

Figure 2:
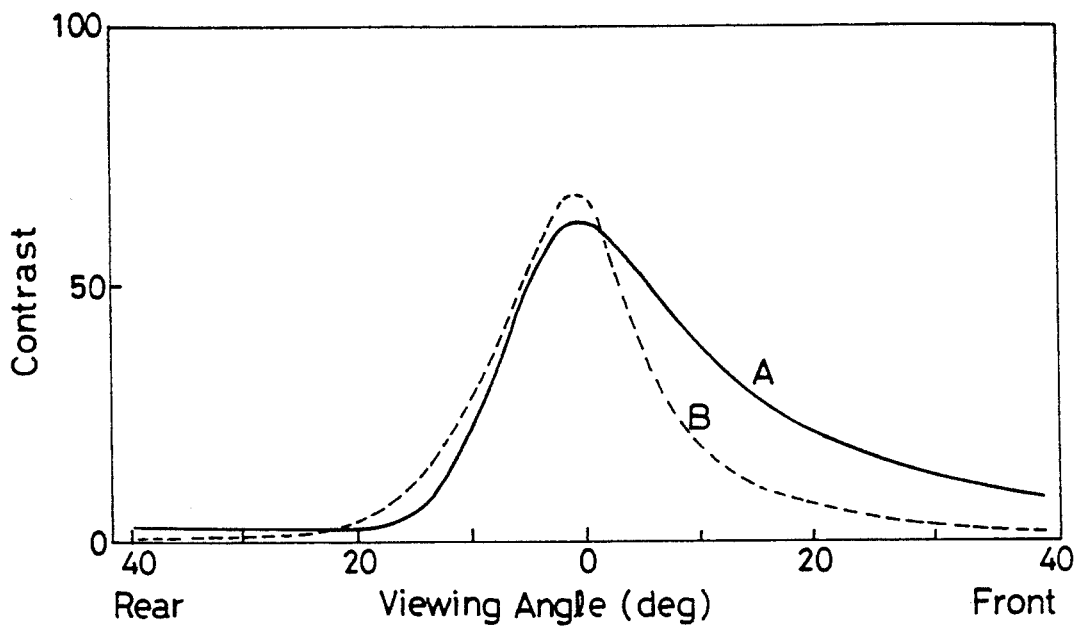
FIG. 2 shows a relationship between the viewing angle and the contrast characteristic (front to rear) in a liquid crystal display device according to Example of the present invention and a liquid crystal display device having no compensation cell.
Figure 3:
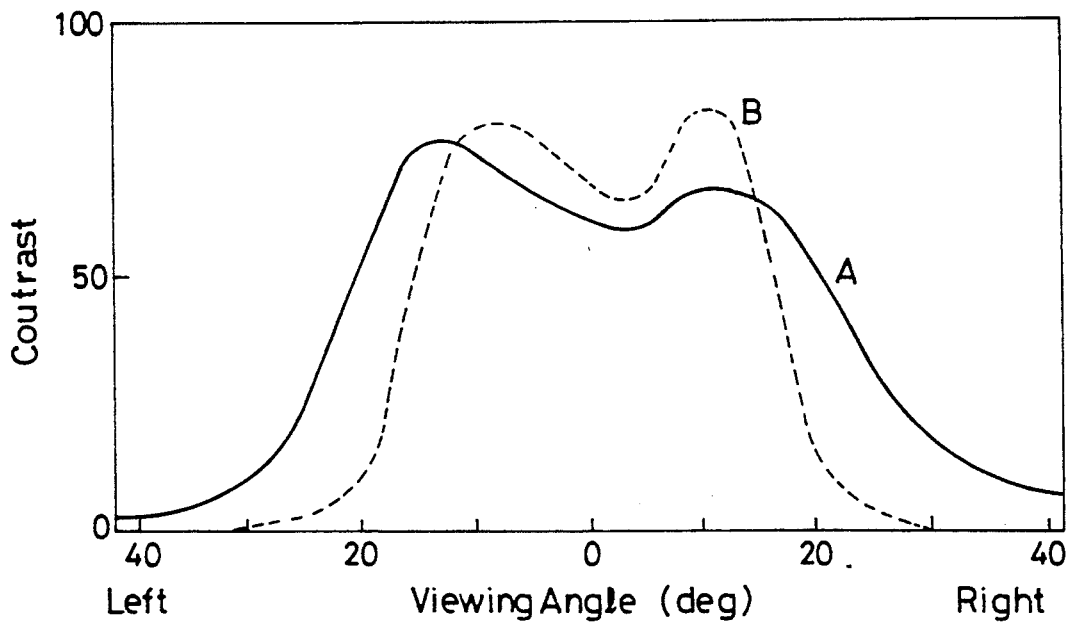
FIG. 3 shows a relationship between the viewing angle and the contrast characteristic (right to left) in a liquid crystal display device according to Example of the present invention and a liquid crystal display device having no compensation cell.

The driven cell and the compensating cell prepared as above were joined to each other, and a pair of neutral gray polarizing plates were disposed further such that the two cells are sandwiched therebetween, to prepare a liquid crystal liquid display device according to the present invention. The upper and the lower polarizing plates were disposed such that their transmission axes were orthogonal to each other and formed respectively an angle of 45° to the rubbing direction of the driven cell. The display device was black when a voltage was not applied thereto, and had a complete shading property, and turned white (transparent) under the application of a voltage higher than about 3V. FIGS. 2A and 3A show the relationship between the viewing angle and contrast characteristic when the liquid crystal display device according to the present invention was operated by multiplexing drive at 1/100 duty and thus, a liquid crystal display device having an extremely wide visual angle was obtained.

(4) Comparison with the device having no liquid crystal cell for viewing angle compensation A liquid crystal display device was constituted without using the compensation cell prepared in (3) above. The device was black and had high shading property when the device was viewed from front and a voltage was not applied thereto, but it was observed that the light came remarkably through the device when viewed diagonally. Accordingly, it was confirmed by the viewing angle-contrast characteristics shown in FIGS. 2B and 3B that the visual angle was extremely narrowed.

What is claimed is:

1. A DAP type-ECB system liquid crystal display device comprising:
   (1) a liquid crystal cell in which a liquid crystal layer is sandwiched between a pair of substrates each of which has at least one electrode;
   (2) a birefringent layer sandwiched between the liquid crystal cell and a substrate which does not have an electrode; and
   (3) a pair of polarizers sandwiching therebetween the liquid crystal cell, the birefringent layer and said substrate which does not have an electrode; wherein
      (i) light modulation of the liquid crystal display device is conducted by inputting an electric signal to the electrodes;
      (ii) the birefringent layer comprises a liquid crystal compound showing a cholesteric phase, or a polymer film obtained by quenching a polymer showing a cholesteric phase to fix the aligned direction of the polymer molecules,
      (iii) an axis of the helical structure of molecules of the compound or the film is substantially perpendicular to a plane of the birefringent layer; and
      (iv) a product of a pitch of the helical structure of the cholesteric liquid crystal phase or the polymer film and a refractive index in the maximum refractive index direction of the birefringent layer is smaller than 400 nm.

2. A DAP type-ECB system liquid crystal display device, comprising:
   (1) a liquid crystal cell in which a liquid crystal layer is sandwiched between a pair of substrates each of which has at least one electrode;
   (2) a birefringent layer sandwiched between the liquid crystal cell and a substrate which does not have an electrode; and
   (3) a pair of polarizers sandwiching therebetween the liquid crystal cell, the birefringent layer and said substrate which does not have an electrode; wherein
      (i) light modulation of the liquid crystal display device is conducted by inputting an electric signal to the electrodes;
      (ii) the birefringent layer comprises a liquid crystal compound showing a cholesteric phase, or a polymer film obtained by quenching a polymer showing a cholesteric phase to fix the aligned direction of the polymer molecules, and molecules of the liquid crystal or the polymer in the birefringent layer are substantially isotropic to visible rays within the plane of the birefringent layer, and the refractive index in a direction perpendicular to the plane is smaller than the average refractive index within this plane;
      (iii) an axis of the helical structure of molecules of the compound or the film is substantially perpendicular to a plane of the birefringent layer; and
      (iv) a product of a pitch of the helical structure of the cholesteric liquid crystal phase or a polymer film, and a refractive index in the maximum refractive index direction of the birefringent layer, is smaller than 400 nm.

3. A DAP type-ECB system liquid crystal display device, comprising:
   (1) a liquid crystal cell in which a liquid crystal layer is sandwiched between a pair of substrates each of which has at least one electrode;
   (2) a birefringent layer sandwiched between the liquid crystal cell and one of a pair of polarizers; and
   (3) a pair of polarizers sandwiching therebetween the liquid crystal cell the birefringent layer; wherein
      (i) light modulation of the liquid crystal display device is conducted by inputting an electric signal to the electrodes;
      (ii) the birefringent layer comprises a polymer film obtained by quenching a polymer showing a cholesteric phase to fix the aligned direction of the polymer molecules, and molecules of the polymer in the birefringent layer are substantially isotropic to visible rays within the plane of the birefringent layer, and the refractive index in a direction perpendicular to the plane is smaller than the average refractive index within the plane;
      (iii) an axis of the helical structure of molecules of the compound or the film is substantially perpendicular to a plane of the birefringent layer; and
      (iv) a product of a pitch of the helical structure of the cholesteric liquid crystal phase or the polymer film, and a refractive index in the maximum refractive index direction of the birefringent layer is smaller than 400 nm.

4. A device as defined in claim 2 or 3, wherein said polymer comprises a copolymer of benzyl-L-glutamate and dodecyl-L-glutamate.

5. The device according to claim 2 or 3, wherein the polymer comprises a copolymer obtained by a reaction of 4,4'-dihydroxybiphenyl, (+)-3-methyladipic acid and an aliphatic dicarboxylic acid.

6. The device according to claim 2 or 3, wherein said liquid crystal compound is selected from azomethine compounds represented by the formula:

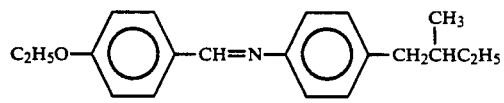

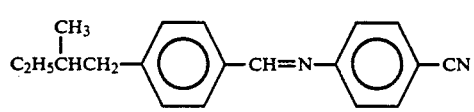

7. The device according to claim 2 or 3, wherein said liquid crystal compound is selected from azoxy compounds represents by the formula:

8. The device according to claim 2 or 3, wherein said liquid crystal compound is selected from ester compounds represented by the formula:

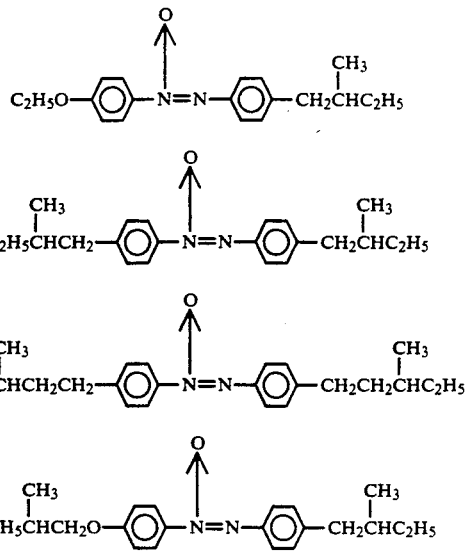

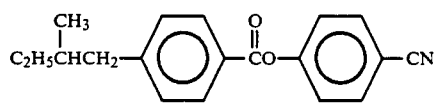

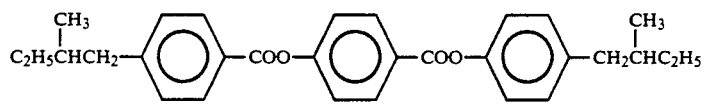

* * * * *

UNITED STATES PATENT AND TRADEMARK OFFICE
CERTIFICATE OF CORRECTION

PATENT NO. : 5,243,451
DATED : September 7, 1993
INVENTOR(S) : Akihiko Kanemoto et al.

It is certified that error appears in the above-indentified patent and that said Letters Patent is hereby corrected as shown below:

On the title page, Item [54] and Column 1, Line 1,

The title, should read: --DAP TYPE LIQUID CRYSTAL DISPLAY DEVICE WITH CHOLESTERIC LIQUID CRYSTAL BIREFRINGENT LAYER--

Signed and Sealed this

Twelfth Day of April, 1994

Attest:

BRUCE LEHMAN

*Attesting Officer*     *Commissioner of Patents and Trademarks*